(12) United States Patent
Ziaei et al.

(10) Patent No.: US 9,324,461 B2
(45) Date of Patent: Apr. 26, 2016

(54) FUEL CHANNEL ANNULUS SPACER

(71) Applicant: Atomic Energy of Canada Limited, Mississauga (CA)

(72) Inventors: Reza Ziaei, Thornhill (CA); Gordon Rife, Schomberg (CA); Donald Ray Metzger, Mississauga (CA)

(73) Assignee: Atomic Energy of Canada Limited, Ontario (CA)

( * ) Notice: Subject to any disclaimer, the term of this patent is extended or adjusted under 35 U.S.C. 154(b) by 5 days.

(21) Appl. No.: 14/521,931

(22) Filed: Oct. 23, 2014

(65) Prior Publication Data

US 2015/0213908 A1 Jul. 30, 2015

Related U.S. Application Data

(62) Division of application No. 13/046,391, filed on Mar. 11, 2011, now abandoned.

(60) Provisional application No. 61/431,341, filed on Jan. 10, 2011, provisional application No. 61/355,474, filed on Jun. 16, 2010.

(51) Int. Cl.
*G21C 3/04* (2006.01)
*G21C 15/02* (2006.01)

(52) U.S. Cl.
CPC *G21C 3/04* (2013.01); *G21C 15/02* (2013.01); *Y02E 30/40* (2013.01); *Y10T 29/49615* (2015.01)

(58) Field of Classification Search
CPC .............. G21C 5/06; G21C 5/10; G21C 3/12; G21C 3/33; G21C 3/331; B21F 3/12; B25J 17/02; B25J 17/0208; B25J 17/0225; B25J 17/0233; Y02E 30/40; F16L 37/2445
USPC ......... 376/362, 363, 364; 140/71 C; 403/296; 24/591.1, 594.1, 910; 267/150, 167
See application file for complete search history.

(56) References Cited

U.S. PATENT DOCUMENTS 1,847,378 A * 3/1932 Browning ........................ 267/74
2,001,835 A * 5/1935 Cook .......................... 267/166.1
(Continued)

OTHER PUBLICATIONS

"Assessment and management of ageing of major nuclear power plant components important to safety: CANDU pressure tubes," International Atomic Energy Agency, Aug. 1998, Austria, accessed at http://www-pub.iaea.org/MTCD/publications/PDF/te_1037_prn.pdf (107 pages).

*Primary Examiner* — Bret Hayes
(74) *Attorney, Agent, or Firm* — Michael Best & Friedrich LLP

(57) ABSTRACT

An annulus spacer for a fuel channel assembly of a nuclear reactor. The fuel channel assembly includes a calandria tube and a pressure tube positioned at least partially within the calandria tube. The annulus spacer includes a garter spring configured to surround a portion of the pressure tube to maintain a gap between the calandria tube and the pressure tube. The garter spring includes a first end and a second end. The annulus spacer also includes a connector coupled to the first end and the second end of the garter spring. The connector allows movement of the annulus spacer when the pressure tube moves relative to the calandria tube during thermal cycles of the fuel channel assembly. The annulus spacer further includes a girdle wire positioned substantially within the garter spring and configured to form a loop around the pressure tube.

28 Claims, 17 Drawing Sheets

(56) References Cited

U.S. PATENT DOCUMENTS

| | | | | |
|---|---|---|---|---|
| 2,721,091 A * | 10/1955 | Pfefferle et al. | | 277/618 |
| 3,157,056 A * | 11/1964 | Gray et al. | | 474/239 |
| 3,190,633 A * | 6/1965 | Jack | | 267/167 |
| 3,359,617 A * | 12/1967 | Baumler | | 29/896.9 |
| 3,574,373 A * | 4/1971 | Le Derf et al. | | 403/296 |
| 4,203,305 A * | 5/1980 | Williams | | 464/60 |
| 4,509,763 A * | 4/1985 | Fischer | | 277/342 |
| 5,503,375 A * | 4/1996 | Balsells | | 267/167 |
| 2010/0123311 A1* | 5/2010 | Church | | 285/334 |

\* cited by examiner

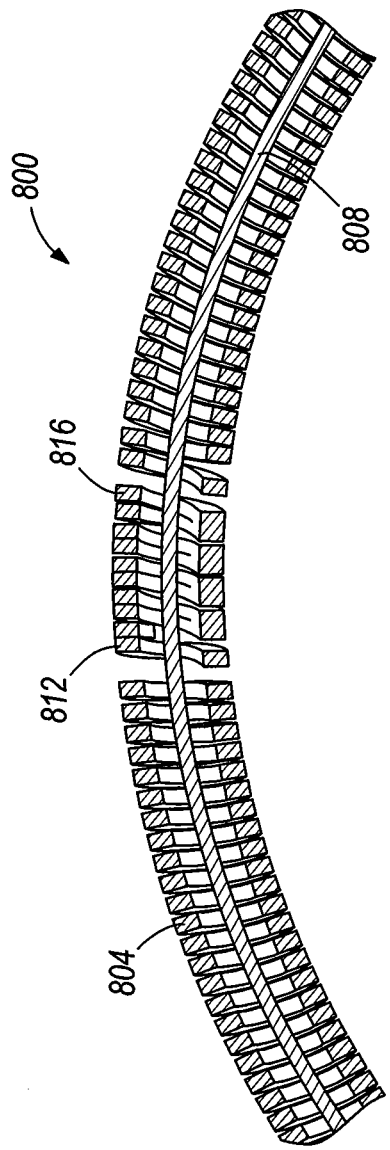
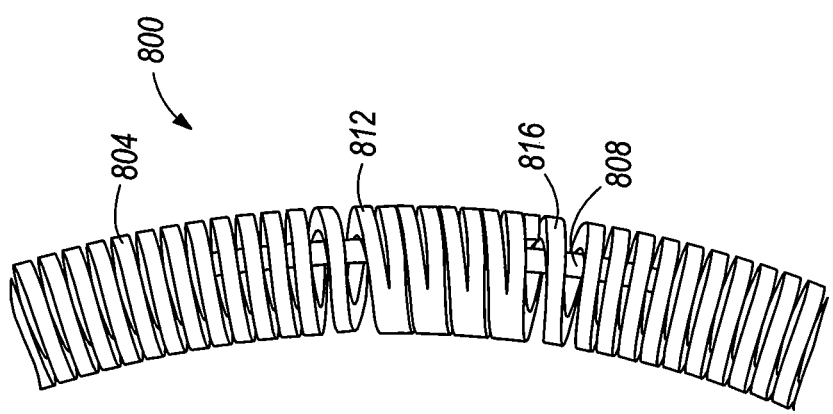
FIG. 8B
FIG. 8A

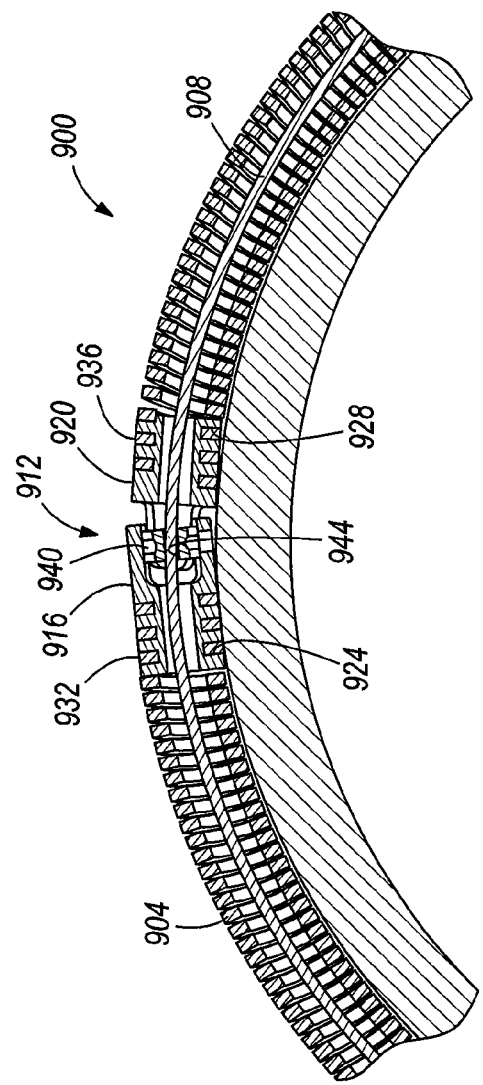
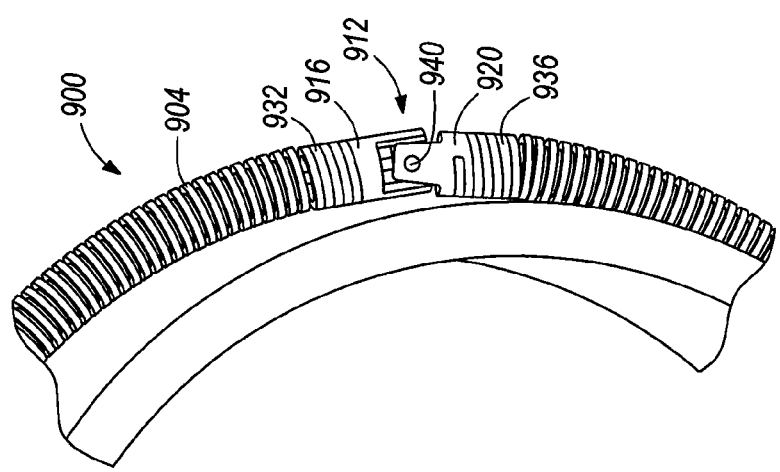

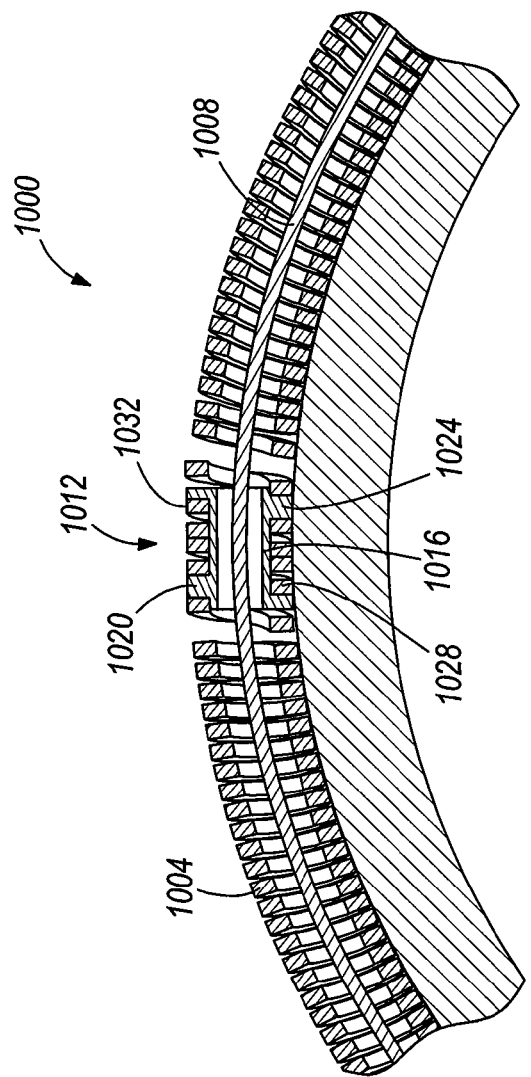
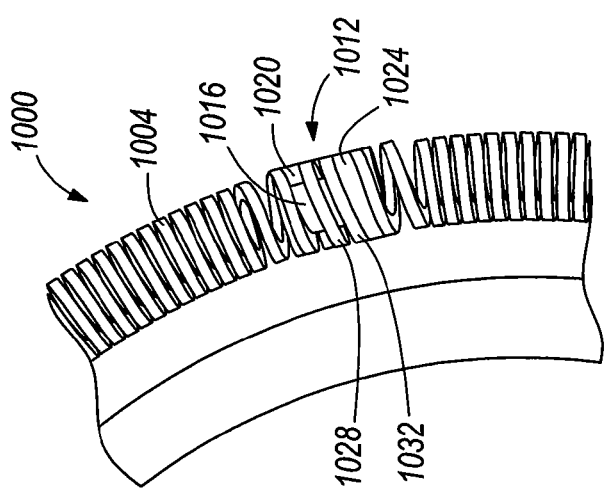

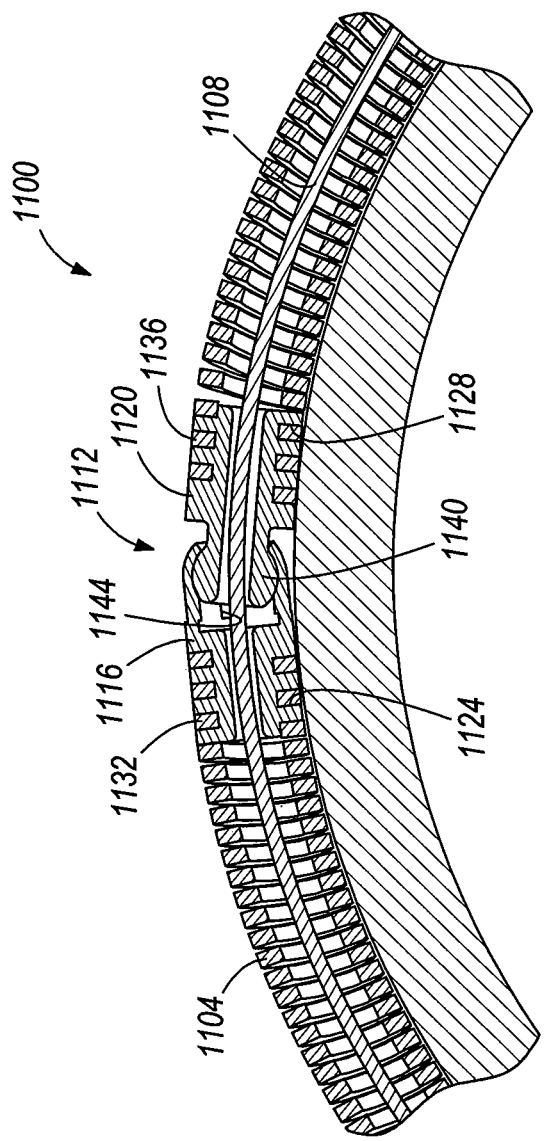
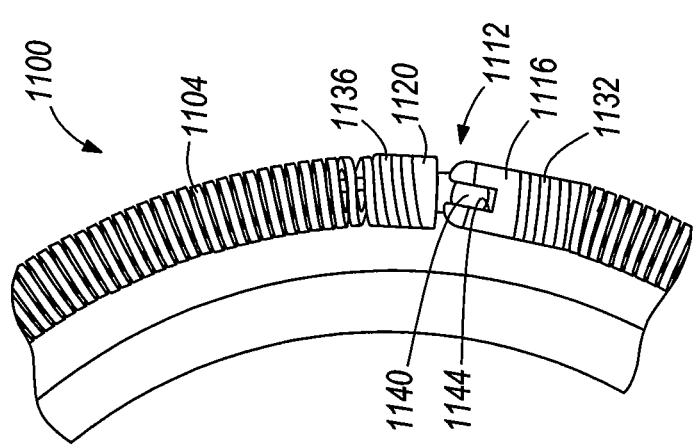
FIG. 11B
FIG. 11A

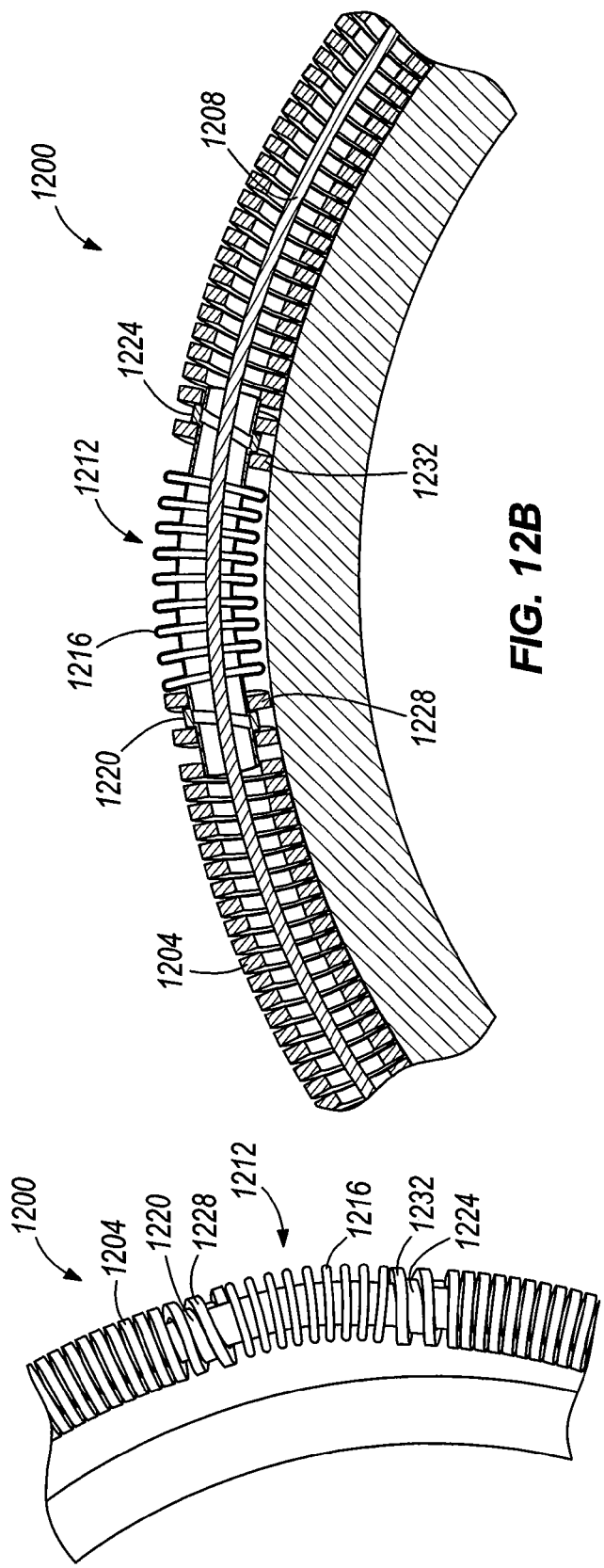

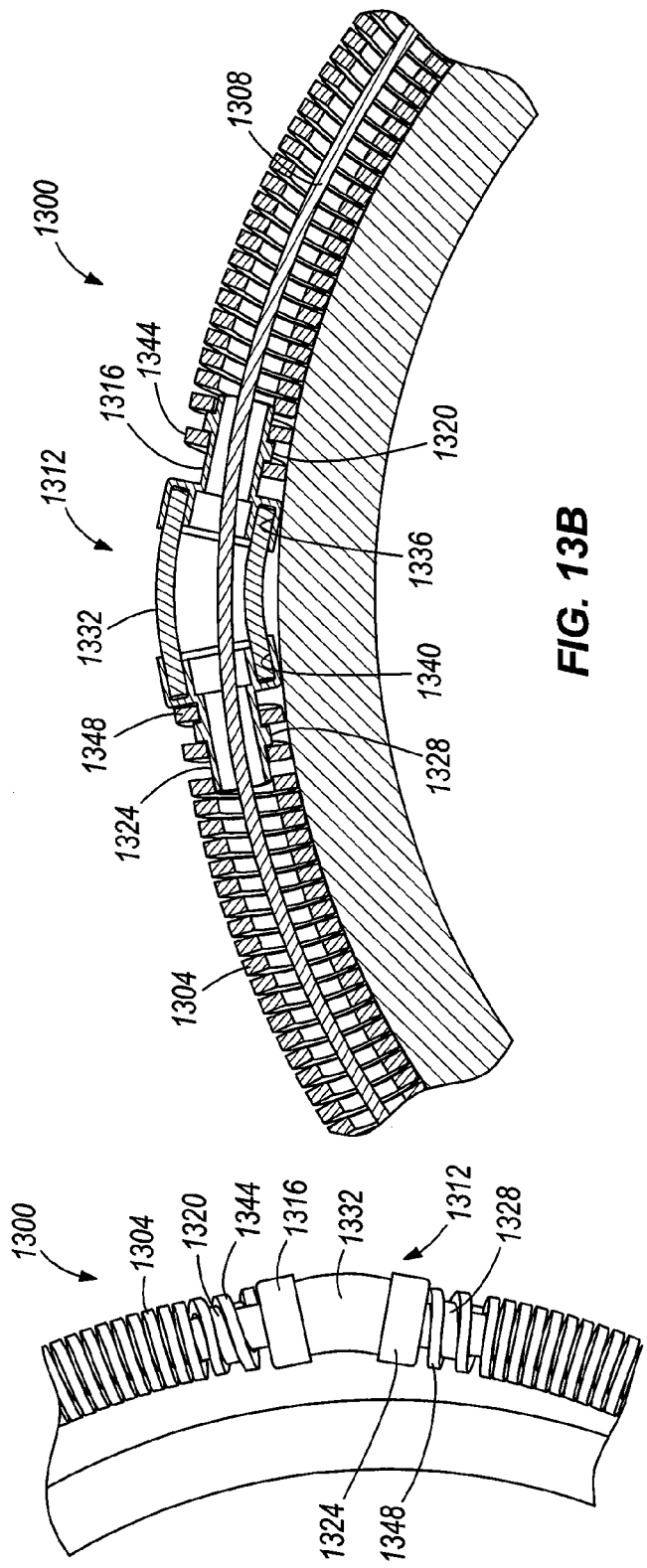

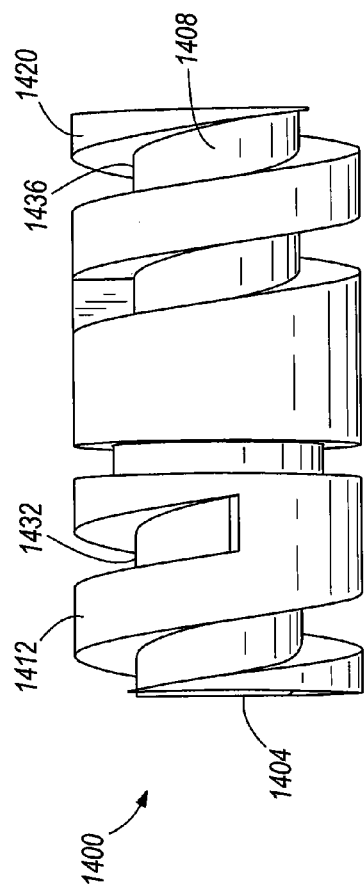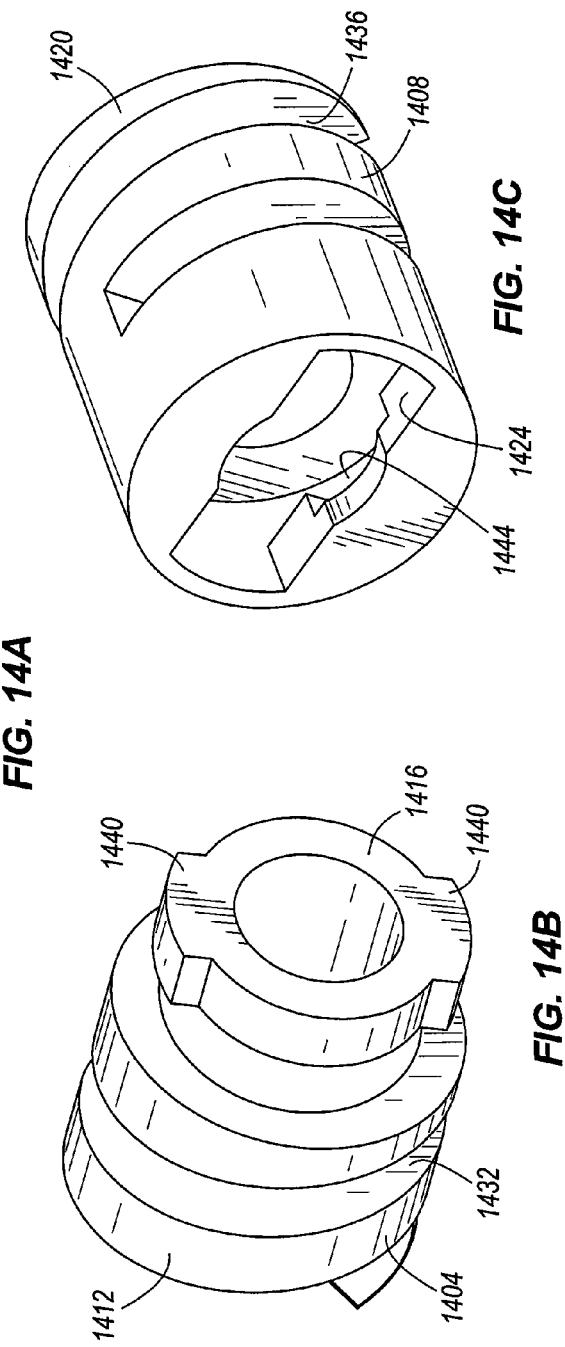
FIG. 14A
FIG. 14B
FIG. 14C

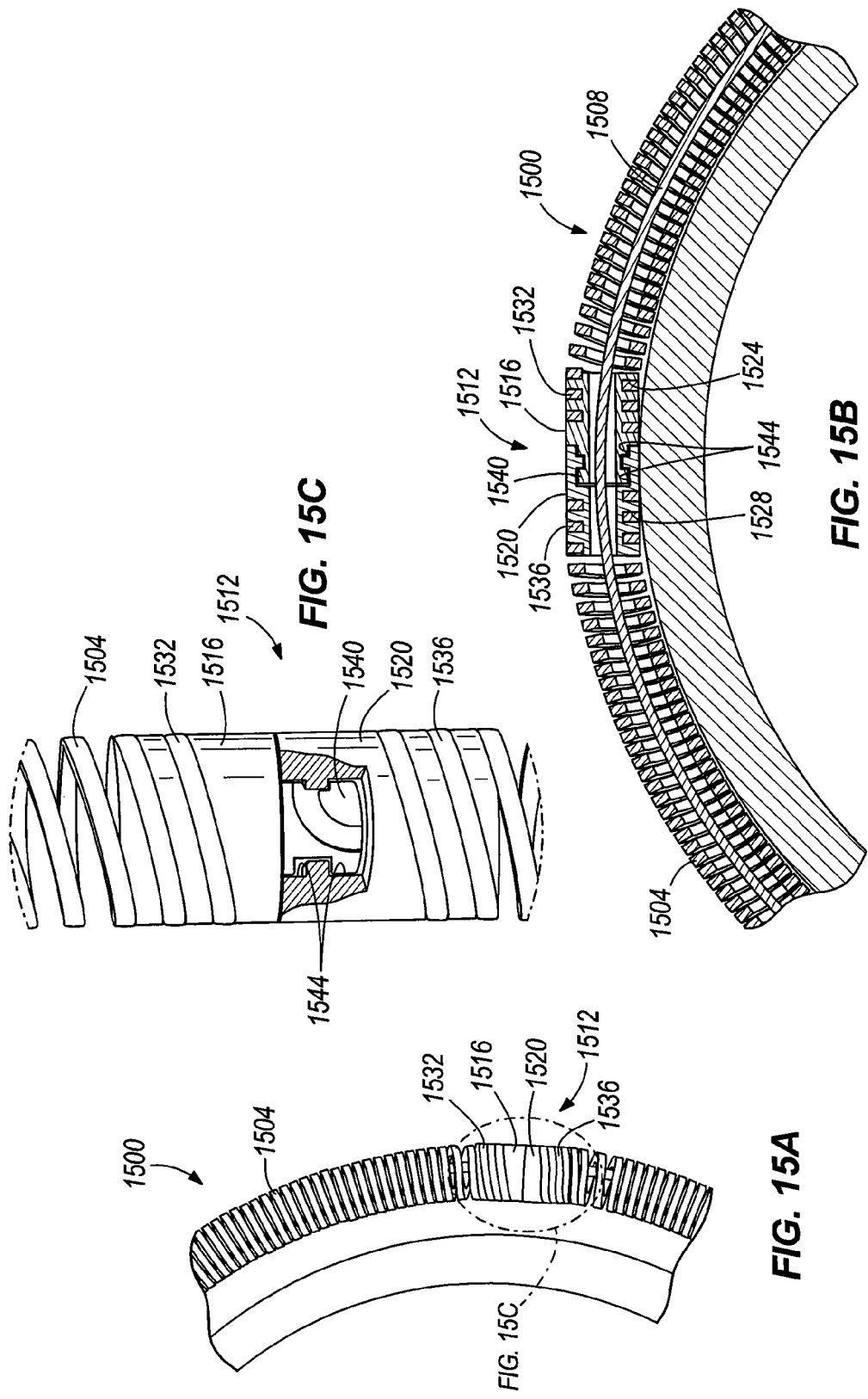

FUEL CHANNEL ANNULUS SPACER

CROSS-REFERENCE TO RELATED APPLICATIONS

This application is a divisional of U.S. patent application Ser. No. 13/046,391, filed on Mar. 11, 2011, which claims priority to U.S. Provisional Patent Application No. 61/355,474, filed Jun. 16, 2010, and to U.S. Provisional Patent Application No. 61/431,341, filed Jan. 10, 2011, the entire contents of all of which are hereby incorporated by reference.

FIELD OF THE INVENTION

The present invention relates to fuel channels for nuclear reactors. More particularly, the invention relates to an annulus spacer for use in the fuel channel of a CANDU-type nuclear reactor. The CANDU ("CANada Deuterium Uranium") reactor is a heavy water or light water cooled, heavy-water moderated, fission reactor capable of using fuels composed of natural uranium, other low-enrichment uranium, recycled uranium, mixed oxides, fissile and fertile actinides, and combinations thereof.

SUMMARY

In one embodiment, the invention provides an annulus spacer for a fuel channel assembly of a nuclear reactor, the fuel channel assembly including a calandria tube and a pressure tube positioned at least partially within the calandria tube, the annulus spacer comprising a garter spring configured to surround a portion of the pressure tube to maintain a gap between the calandria tube and the pressure tube, the garter spring including a first end and a second end; a connector coupled to the first end and the second end of the garter spring, the connector allowing movement of the annulus spacer when the pressure tube moves relative to the calandria tube during thermal cycles of the fuel channel assembly; and a girdle wire positioned substantially within the garter spring and configured to form a loop around the pressure tube.

In another embodiment, the invention provides an annulus spacer for a fuel channel assembly of a nuclear reactor, the fuel channel assembly including a calandria tube and a pressure tube positioned at least partially within the calandria tube, the annulus spacer comprising a garter spring configured to surround a portion of the pressure tube to maintain a gap between the calandria tube and the pressure tube; and a girdle wire positioned substantially within the garter spring and configured to form a loop around the pressure tube, the girdle wire including a first segment and a second segment that overlaps the first segment to form an overlap, the overlap extending between approximately 45 degrees and approximately 135 degrees to reduce the possibility of girdle wire twisting.

In yet another embodiment, the invention provides a method of manufacturing an annulus spacer for a fuel channel assembly of a nuclear reactor, the method comprising providing a garter spring wire having a trapezoidal cross-section, a first end, and a second end; bending the garter spring wire into a coil to induce compressive strain on an inner portion of the trapezoidal cross-section and tensile strain on an outer portion of the trapezoidal cross-section such that the garter spring wire obtains a rectangular cross-section; positioning a girdle wire within the coil formed by the garter spring wire; and coupling the first end of the garter spring wire to the second end of the garter spring wire to form a toroid.

Other aspects of the invention will become apparent by consideration of the detailed description and accompanying drawings.

BRIEF DESCRIPTION OF THE DRAWINGS

FIG. 8A illustrates a portion of an annulus spacer for use with a CANDU-type nuclear reactor.

FIG. 8B is a cross-section of the annulus spacer shown in FIG. 8A.

FIG. 9A illustrates a portion of another annulus spacer for use with a CANDU-type nuclear reactor.

FIG. 9B is a cross-section of the annulus spacer shown in FIG. 9A.

FIG. 10A illustrates a portion of yet another annulus spacer for use with a CANDU-type nuclear reactor.

FIG. 10B is a cross-section of the annulus spacer shown in FIG. 10A.

FIG. 11A illustrates a portion of still another annulus spacer for use with a CANDU-type nuclear reactor.

FIG. 11B is a cross-section of the annulus spacer shown in FIG. 11A.

FIG. 12A illustrates a portion of yet still another annulus spacer for use with a CANDU-type nuclear reactor.

FIG. 12B is a cross-section of the annulus spacer shown in FIG. 12A.

FIG. 13A illustrates a portion of another annulus spacer for use with a CANDU-type nuclear reactor.

FIG. 13B is a cross-section of the annulus spacer shown in FIG. 13A.

FIG. 14A illustrates a multiple component connector of an annulus spacer for use with a CANDU-type nuclear reactor.

FIG. 14B is a perspective view of a first connector of the multiple component connector shown in FIG. 14A.

FIG. 14C is a perspective view of a second connector of the multiple component connector shown in FIG. 14A.

FIG. 15A illustrates a portion of yet another annulus spacer for use with a CANDU-type nuclear reactor.

FIG. 15B is a cross-section of the annulus spacer shown in FIG. 15A.

FIG. 15C is an enlarged view of a portion of the annulus spacer shown in FIG. 15A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
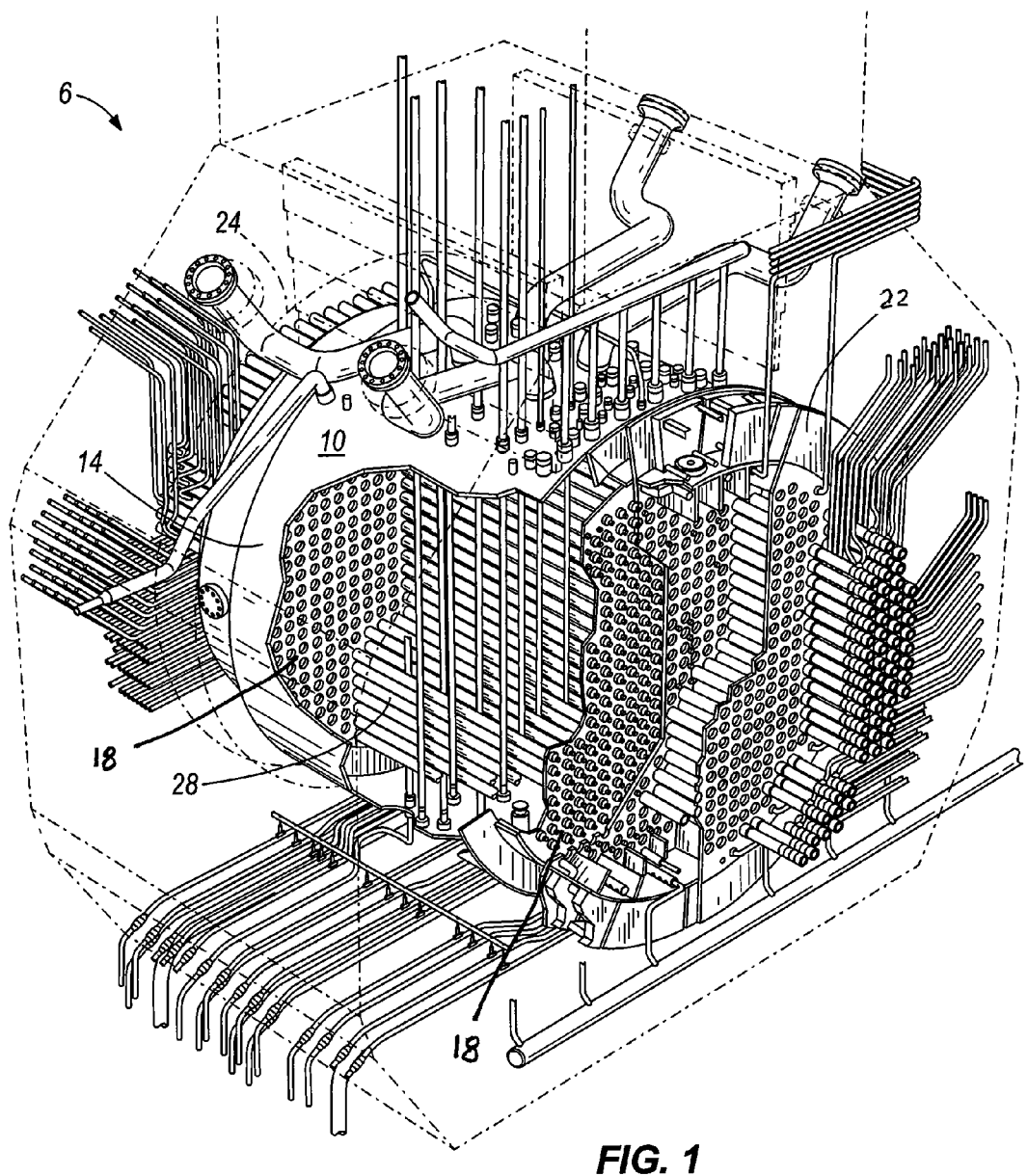
FIG. 1 is a perspective view of a reactor core of a CANDU-type nuclear reactor.

FIG. 1 is a perspective of a reactor core of a CANDU-type reactor 6. A generally cylindrical vessel, known as a calandria 10, contains a heavy-water moderator. The calandria 10 has an annular shell 14 and a tube sheet 18 at a first end 22 and second end 24. A number of fuel channel assemblies 28 pass through the calandria 10 from the first end 22 to the second end 24.

Figure 2:
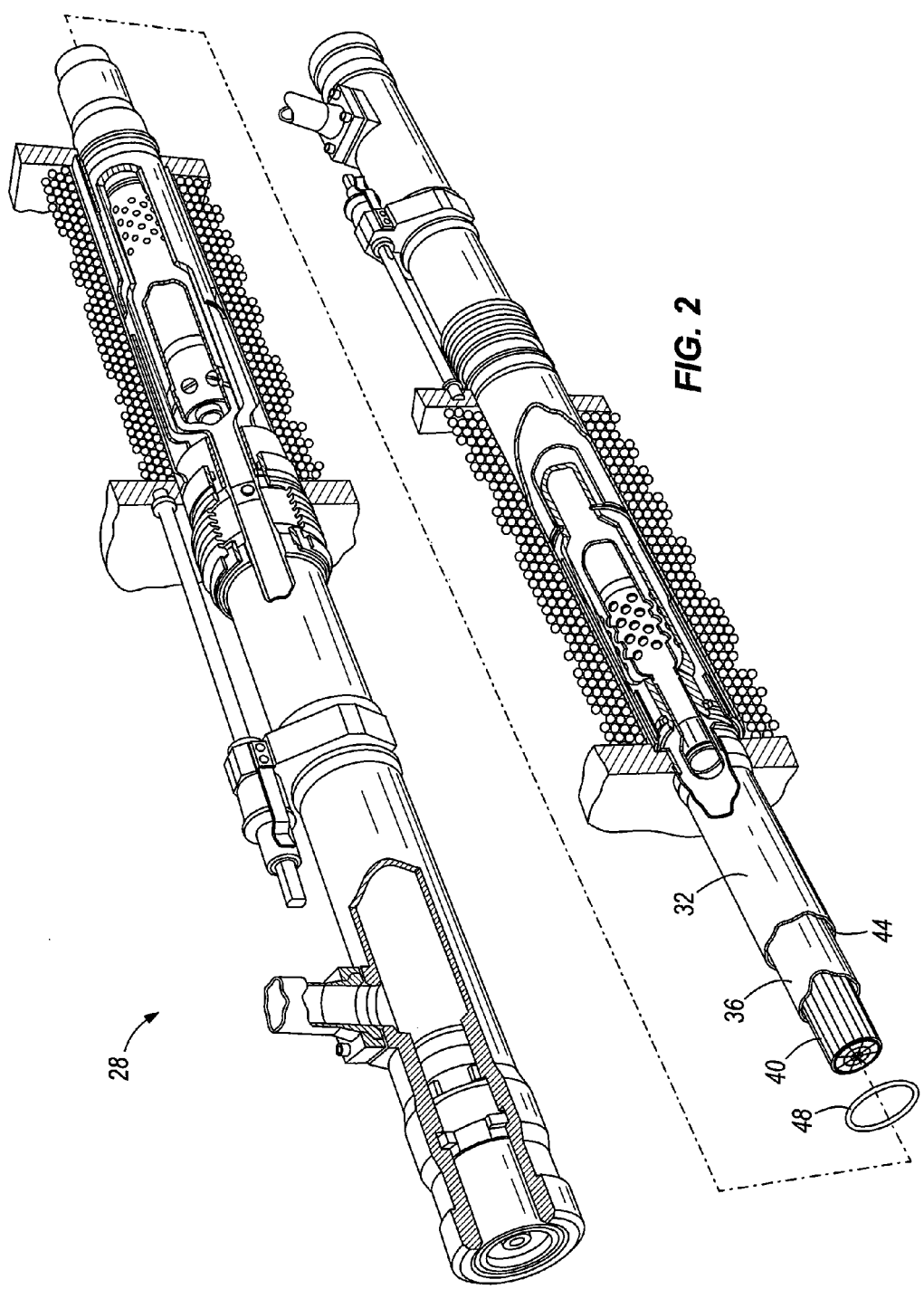
FIG. 2 is a cut away view of a CANDU-type nuclear reactor fuel channel assembly.

As illustrated in FIG. 2, each fuel channel assembly 28 is surrounded by a calandria tube (CT) 32. The CT 32 forms a first boundary between the heavy water moderator of the calandria 10 and the fuel channels assemblies 28. A pressure tube (PT) 36 forms an inner wall of the fuel channel assembly 28. The PT 36 provides a conduit for reactor coolant and fuel assemblies 40. An annulus space 44 is defined by a gap between the PT 36 and the CT 32. The annulus space 44 is normally filled with a circulating gas, such as dry carbon dioxide, nitrogen, air or mixtures thereof. The annulus space 44 and gas are part of an annulus gas system. The annulus gas system has two primary functions. First, a gas boundary between the CT 32 and PT 36 provides thermal insulation between hot reactor coolant and fuel within the PTs 36 and the relatively cool CTs 32. Second, the annulus gas system provides indication of a leaking calandria tubes, pressure tubes 36, or their connections via the presence of moisture in the annulus gas.

An annulus spacer 48 is disposed between the CT 32 and PT 36. Functionally, the annulus spacer 48 serves roles in ensuring the safe, long-term operation of CANDU-type nuclear reactors. The annulus spacer 48 maintains the gap between the PT 36 and the corresponding CT 32, while allowing the passage of the annulus gas through and around the annulus spacer 48. More specifically, the annulus spacer 48 substantially minimizes the risk of contact between the CT 32 and PT 36 under Design Level A and B service conditions and Level C transients for the design life of the fuel channel, with the exception of a design basis earthquake with a fueling machine attached. The PT 36 would be inspected after such an earthquake, and if significant permanent deformation or damage has taken place, shall be replaced.

The annulus spacer 48 limits heat transfer from the PT 36 to the heavy-water moderator during normal operating conditions, thus increasing the thermal efficiency of the reactor, and ensuring that hot PTs 36 are not locally cooled. Thermal gradients in the wall of a PT 36 can permit hydrogen (deuterium) diffusion along the gradient above threshold hydrogen concentrations. High hydrogen concentrations may allow hydride accumulation and the potential for unstable cracking during the PT 36 design life.

Other functions of the annulus spacer 48 include accommodating relative axial movement between the PT 36 and CT 32 while limiting wear/scratches/deformation/damage to the PTs 36 and CTs 32, so that integrity and performance are maintained throughout the design life of the fuel channel. The annulus spacers 48 are configured to withstand the annulus gas environmental conditions without substantial degradation for the design life of the fuel channel. The annulus spacer 48 is further configured to limit parasitic neutron absorption and thereby reduce the fuel burn-up penalty by careful selection of spacer dimensions, spring cross-section, geometry, connections, and material.

The performance requirements of the annulus spacer 48 are primarily based upon the functional requirements. In some embodiments, the annulus spacer 48 may withstand the maximum predicted PT 36 to CT 32 vertical interaction load specified in the applicable Fuel Channel Design Specification, without impeding the functional requirements of the spacer design or causing unacceptable deformation to the PT 36 or the CT 32. In some embodiments, the cross-section of the annulus spacer 48 is optimized as a square shape in order to maximize the load bearing capability in bending while minimizing the amount of material used. The annulus spacer 48 may also withstand PT to CT movement caused by the predicted number of thermal cycles and PT axial elongation specified in an applicable Fuel Channel Design Specification without impeding the functional requirements of the annulus spacer design or causing unacceptable deformation/wear to the PT 36 or the CT 32. Additionally, the annulus spacer 48 may withstand a maximum predicted diametral increase of the PT 36 specified in an applicable Fuel Channel Design Specification without nip-up. Nip-up occurs when the limit of unconstrained diametral expansion of the PT 36 at the location of the annulus spacer 48 has been reached. The annulus spacers 48 may also remain in their design location so as to prevent PT 36 to CT 32 contact throughout the life of the fuel channel. In some embodiments, annulus spacer 48 axial positions may be verifiable during fuel channel inspections throughout the life of the reactor, so as to ensure that PT to CT contact will not occur before the end of the next inspection interval.

From a safety perspective, in some embodiments, the annulus spacer 48 may not result in unacceptable consequences that may affect reactor safeguards analysis. If required by the safety analysis, the annulus spacer 48 may allow contact of a PT 36 with the CT 32 surrounding it over a large enough area to permit a sufficient dissipation of heat for preventing fuel channel failure under a postulated event initiated by an accident condition such as a loss of coolant accident (LOCA). In the illustrated embodiment, the annulus spacer material does not interact with the PT material at high temperature during transients so as to compromise the integrity of the PT 36. In some embodiments, the annulus spacers 48 may also not cause local stresses in the PT 36 that could initiate premature PT failure. During a severe fuel channel flow blockage event, the annulus spacer 48 may not significantly increase the amount of molten material that might be present in the affected channel. The annulus spacers 48 may allow relatively unimpeded annulus gas flow for leak before break detection purposes.

In some embodiments, the annulus spacer 48 withstands the fuel channel environmental conditions throughout its design life. As the annulus spacer 48 is located in the fuel channel annulus space 44, its temperature can be influenced by either the hot PT 36 (approximately 300° C.) or the cooler CT 32 (approximately 80° C.), depending on which component it is contacting. If the annulus spacer 48 is in contact with both tubes it will experience a temperature gradient between the temperatures of the PT 36 and the CT 32. The temperature of the annulus spacer 48 is further influenced by the contribution of gamma heating, although this effect should be small and is dependent on the spacer material selected. Nevertheless, the impact of gamma heating on the environmental conditions may be assessed once a spacer material and design are selected.

The environment within the fuel channel annulus space 44 is primarily circulating carbon dioxide maintained at a low dew point, containing a small addition of oxygen. The annulus space 44 also experiences a relatively high fast neutron and thermal neutron flux. As there is a slow increase in the dew point of the annulus gas over time, the annulus gas system is periodically purged to maintain the sensitivity of its leak detection function. In the case of an abnormal operating occurrence or a Design Basis Accident (such as a fuel channel leak or pressure tube rupture), fuel channels other than the source channel may be exposed to extended periods of low temperature, moist annulus conditions. The annulus spacer 48 can be manufactured from materials that are stable under irradiation and are capable of withstanding the environmental conditions detailed above, such that any change in mechanical properties or geometries will not affect its integrity or location.

The annulus spacer 48 directly interfaces with the PT 36, the CT 32, and the gas of the annulus gas system. Thus, the annulus spacers 48 should be compatible with these components. The annulus spacers 48 may permit circulation of the annulus gas (comprised of $CO_2$ and small additions of $O_2$) along the fuel channel annulus 44. The annulus spacers 48 can allow the fuel channel annulus to be efficiently dried if water leaks into it. The annulus spacers 48 do not reduce the design life or affect the integrity of the PT 36 or the CT 32 under all normal operating conditions. The annulus spacers 48 do not significantly interfere with the axial expansion of the PT 36, so as to affect the relative axial loading of the PT 36 or the CT 32. Annulus spacers 48 do not cause the formation of a stress riser on either the PT 36 or CT 32 greater than the maximum allowable value determined by the lower bound value for $K_{1H}$. This is needed to demonstrate there is an adequate margin against delayed hydride cracking (DHC) initiation in either tube by the design loading conditions.

Figure 3:
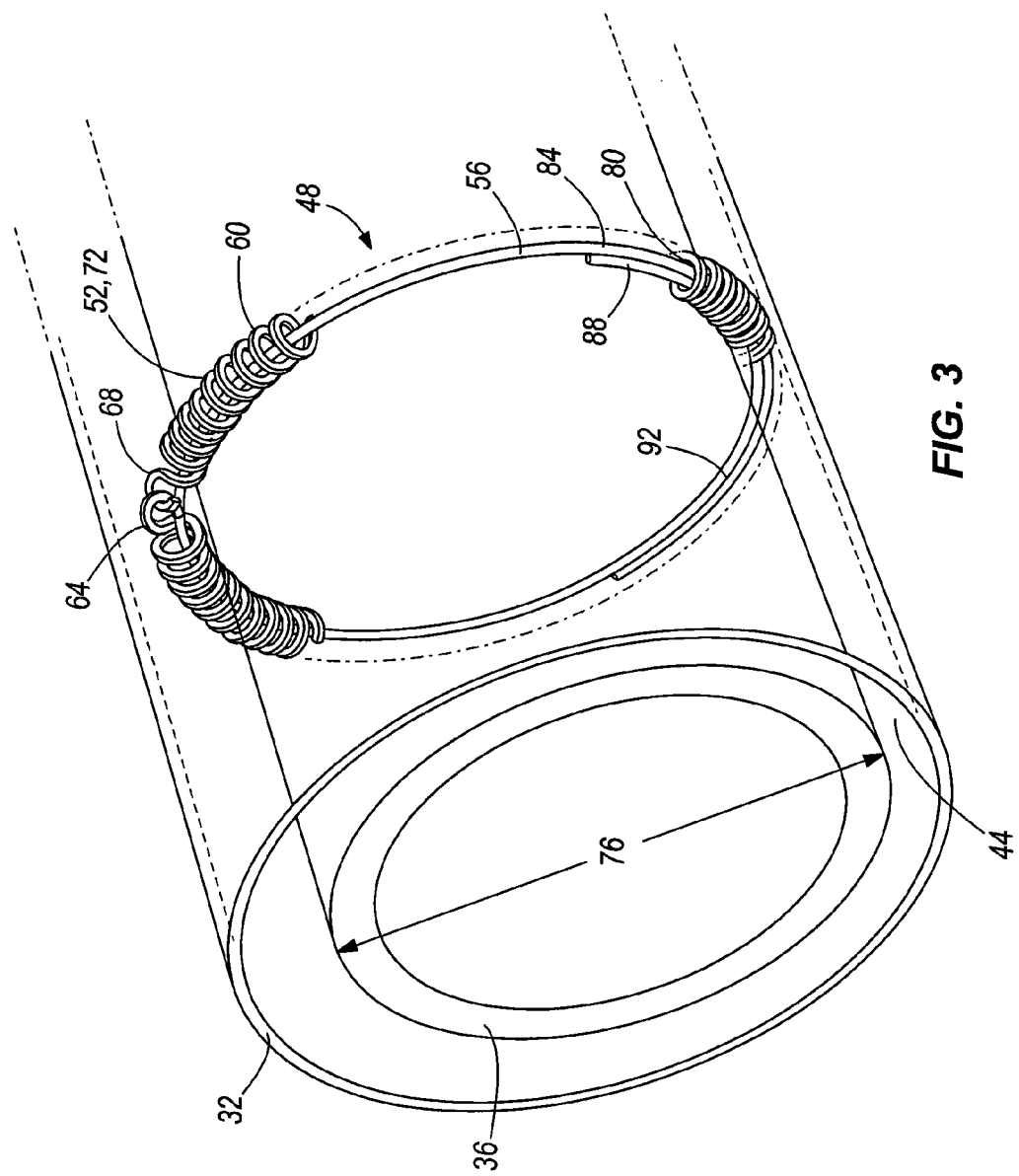
FIG. 3 is a perspective view of an annulus spacer installed in the fuel channel of a CANDU-type nuclear reactor.

FIG. 3 is a more-detailed perspective of an annulus spacer 48 installed within the annulus space 44 between the PT 36 and CT 32. The annulus spacer 48 includes a garter spring 52 and a girdle wire 56. The garter spring 52 is formed from a length of coiled wire 60. Two ends 64 and 68 of the coiled wire 60 are connected so that the garter spring 52 forms a toroid 72. The garter spring 52 is dimensioned to fit tightly around the PT 36. The garter spring 52 is resilient so that it may be expanded to a dimension greater than an outside diameter 76 of the PT 32 during installation, yet fit tightly and securely once positioned. In the illustrated embodiment, the garter spring 52 is formed from a nickel-chromium based alloy such as INCONEL X-750. In other embodiments, the garter spring 52 may be formed of other alloys, including zirconium-based alloy such as ZIRCALOY or a zirconium-niobium-copper alloy. In still other embodiments, the garter spring 52 may be formed of an alloy including, but not limited to, a combination of zirconium, niobium, and copper.

The girdle wire 56 is held within an annular cavity 80 formed by the coiled wire 60 of the garter spring 52. The girdle wire 56 has two functions. First, the girdle wire 56 provides a fail-safe in the event that the garter spring 52 breaks. The girdle wire 56 will capture the separated garter spring 52. Second, in some embodiments the girdle wire 56 improves the ability to detect a position of the annulus spacer 48 using eddy current testing (ECT) techniques. Detecting the position of the annulus spacer 48 is necessary in order to verify the location of the annulus spacer 48 in order to ensure that the annulus spacer 48 meets a variety of functional, performance, safety, environmental and inter-facing system requirements. The girdle wire 56 helps the annulus spacer 48 be detectable by providing a loop of continuous conductivity. In the illustrated embodiment, the girdle wire 56 is formed of a zirconium-based alloy such as ZIRCALOY. In other embodiments, the girdle wire 48 can be formed from a variety of other alloys.

In the illustrated embodiment, an outer segment 84 of the girdle wire 56 overlaps upon an inner segment 88 of the girdle wire 56. An overlap 92 is provided in order to ensure that the girdle wire 56 forms a continuous loop or overlapping loop within the garter spring 52, in order to ensure that the garter spring 52 is captured in the event of failure. However, overlapping portions of the girdle wire 56 may oxidize or move relative to each other over time and during operation of the reactor, degrading the conductivity, and thereby detectability, of the annulus spacer 48. As such, annulus spacers including girdle wires with overlaps may include garter springs that are welded into a continuous loop (as shown in FIGS. 8A-8D) to facilitate detection.

In other embodiments, ends of the girdle wire 56 may be welded together with substantially no overlap. The conductivity, and thereby detectability, of girdle wires with welded ends typically does not degrade over time or during operation of the reactor. Various types of connectors to connect ends of garter springs (such as those shown in FIGS. 9A-15C) may therefore be employed in annulus spacers having welded girdle wires. In some embodiments, ends of the girdle wire 56 may be both overlapped and welded together. Additionally or alternatively, in some embodiments, both the girdle wire 56 and the garter spring 52 may include ends that are welded together.

A girdle wire 56 according to the present invention alleviates a problem known in the nuclear industry as garter spring hang-up. During installation over the PT 36, an overlap 92 of 180 degrees or more could allow the girdle wire 56 to twist upon itself. A twisted girdle wire 56 may, in turn, prevent the garter spring 52 from compressing about the PT 36 when installed. If the garter spring 52 is blocked from compressing due to a twisted girdle wire 56, the functional and performance requirements of the annulus spacer 48 may not be met. In particular, a hung-up garter spring 52 may result in the annulus spacer 48 shifting between inspections and overhauls to the point where PT 36 to CT 32 contact could occur. A hang-up may also result in an annulus spacer installation tool jamming or failing.

The annulus spacer 48 illustrated in FIG. 3 includes features designed to prevent girdle wire twisting. First, the overlap 92 of the girdle wire 56 has been dimensioned in order to minimize the risk of girdle wire twisting. In other words, it is desired that the overlap 92 be long enough to ensure that at least 360 degrees of continuous girdle wire 56 is provided within the coils 60 of the garter spring 52. However, the overlap 92 of the girdle wire 56 of a given configuration should be short enough to ensure that the girdle wire 56 is unlikely to twist upon itself In other words, it is desired that the overlap 92 of the girdle wire 56 remains substantially co-planar with non-overlapping portion of the girdle wire 56 during installation and operation.

The amount of overlap 92 that meets these requirements will depend on the geometry, dimensions and mechanical characteristics of the wire from which the girdle wire 56 is formed. In the illustrated embodiment, it has been found that girdle wire overlaps of between approximately 1 degree and approximately 179 degrees, preferably between approximately 45 and 135 degrees, and even more preferably 75 to 105 degrees minimize the risk of the girdle wire twisting upon itself It should be recognized, however, that these ranges of overlap are based upon a girdle wire of the configuration illustrated.

Figure 4:
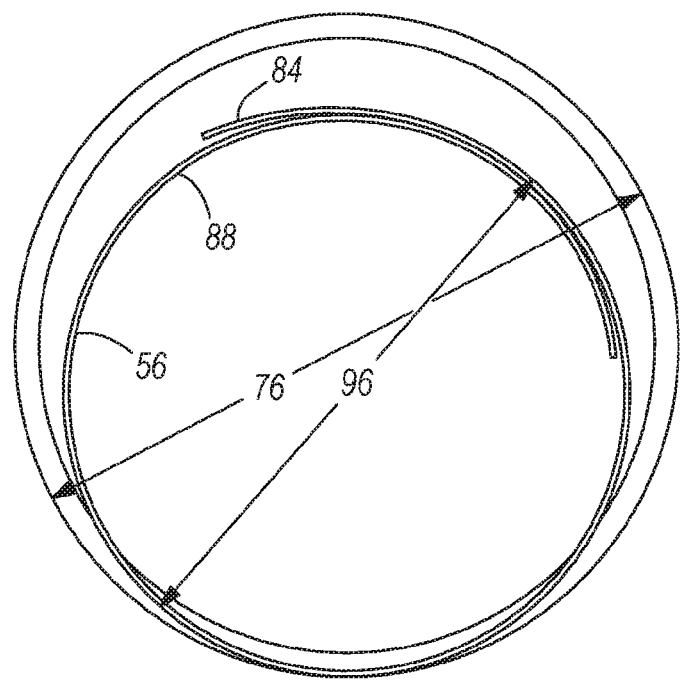
FIG. 4 is a top view showing relative dimensions of a pressure-tube of a CANDU-type nuclear reactor compared to a girdle wire prior to installation over the pressure-tube.

FIG. 4 illustrates a second feature of the girdle wire 56 intended to reduce the risk of girdle twisting. Specifically, the girdle wire 56 is formed with a nominal diameter 96 substantially smaller than the diameter 76 of the pressure tube 36. In one example, the girdle wire 56 is pre-formed with an approximately 3.5 inch diameter. A pressure tube 36 of the configuration illustrated has a diameter 76 of approximately 4.4 inches. When installed within the garter spring 52, a girdle wire 56 of this dimension will exhibit a desirable tendency to compress around the outside diameter 76 of the pressure tube 36. This compression provides additional retention for the annulus spacer 48 position, as well as further minimizing the risk of the girdle wire 56 twisting upon itself.

Figure 5:
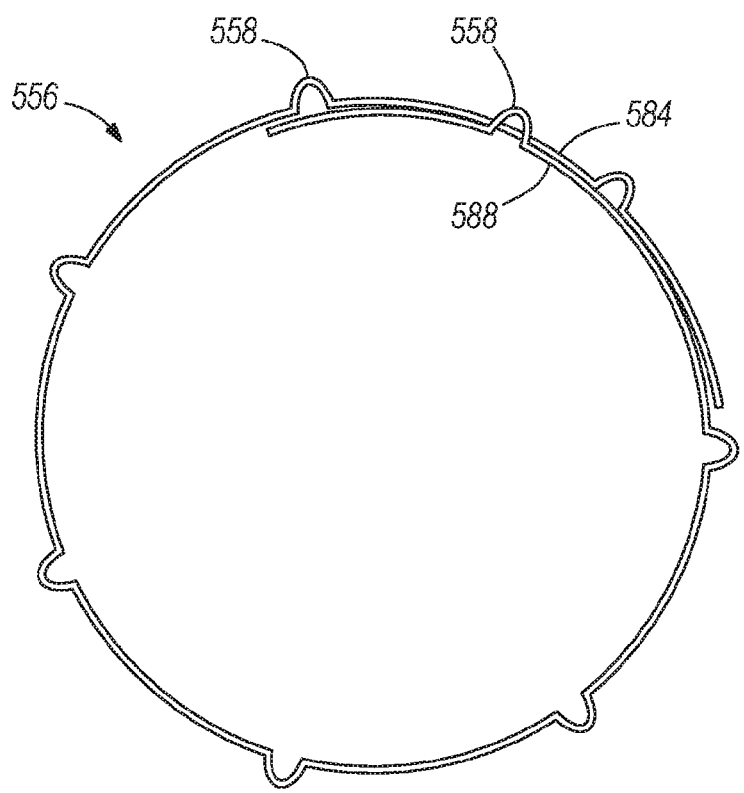
FIG. 5 is a top view of a girdle wire according to another aspect of the invention.

FIG. 5 illustrates another embodiment of a girdle wire 556. In this embodiment, the girdle wire 556 is preformed with a plurality of kinks 558. The kinks 558 are intended to minimize the ability of the girdle wire 556 to twist upon itself The kinks 558 obstruct relative motion between an inner segment 588 and an outer segment 584.

Figure 6:
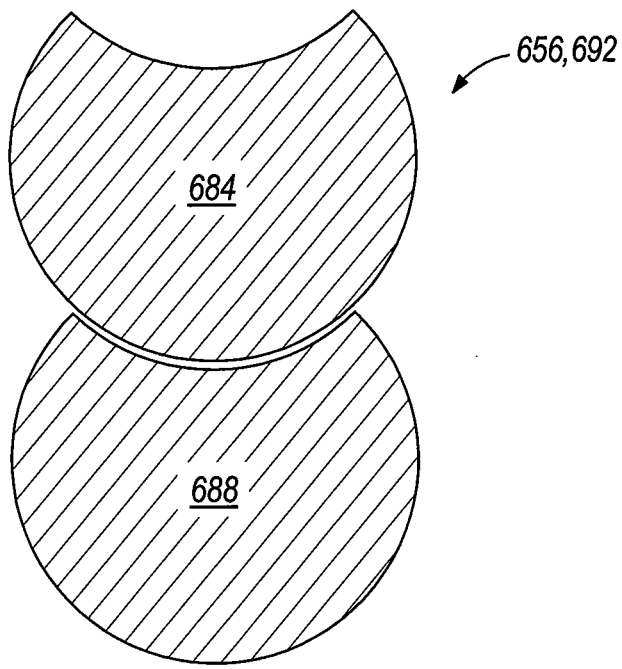
FIG. 6 is a cross-section of a girdle wire according to another embodiment of the invention.

FIG. 6 illustrates a cross-section of yet another embodiment of a girdle wire 656. The cross-section is of an overlap 692 of the girdle wire 656. In this embodiment, the girdle wire 656 has a u-shaped cross-section. Because of the u-shaped cross section, an outer segment 684 of the overlap 692 nests, or mates, with an inner segment 688. The nesting minimizes lateral relative movement between the inner segment 688 and the outer segment 684, thus minimizing the risk of the girdle wire 656 twisting upon itself.

Figure 7:
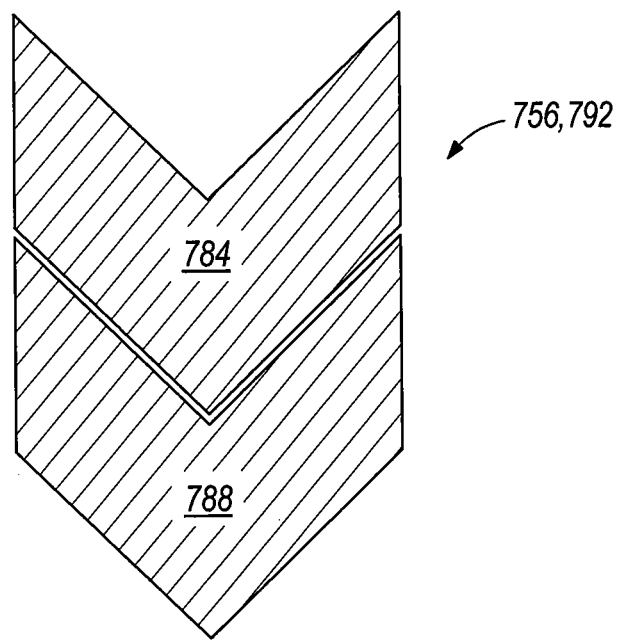
FIG. 7 is a cross-section of a girdle wire according to yet another embodiment of the invention.

FIG. 7 illustrates a cross-section of yet another embodiment of a girdle wire 756. The cross-section is of an overlap 792 of the girdle wire 756. In this embodiment the girdle wire 756 has a deep v-shaped cross-section. Because of the v-shaped cross section, an outer segment 784 of the overlap 792 nests, or mates, with an inner segment 788. Like the embodiment of FIG. 6, the nesting minimizes lateral relative movement between the inner segment 788 and the outer segment 784, thus minimizing the risk of the girdle wire 756 twisting upon itself.

It should be appreciated that the features identified in FIGS. 3, 4, 5, 6, and 7 may be combined in various embodiments of the invention. Thus, for example, an overlap 92 having the dimensions of FIG. 3 may be combined with the kinks 558 of FIG. 5, in a girdle wire have a non-circular cross-section such as that disclosed in FIG. 6 or 7. Furthermore, the invention may include any other combination of the concepts disclosed herein.

Figure 8D:
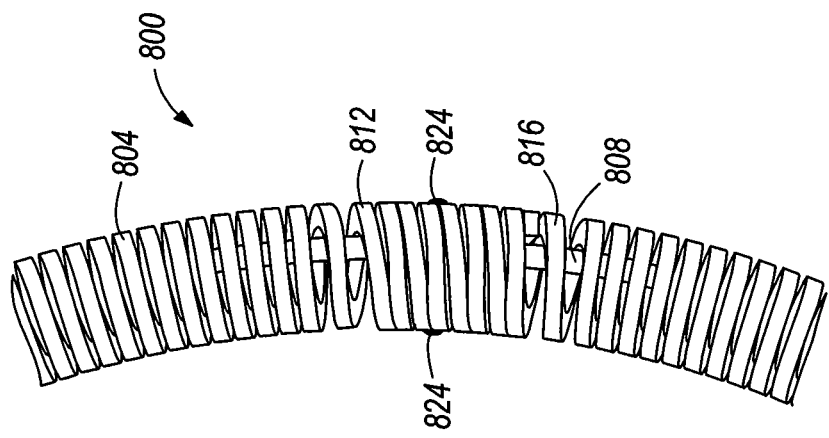
FIG. 8D illustrates the portion of the annulus spacer shown in FIG. 8A with a plurality of spot welds or fusion welds.
Figure 8C:
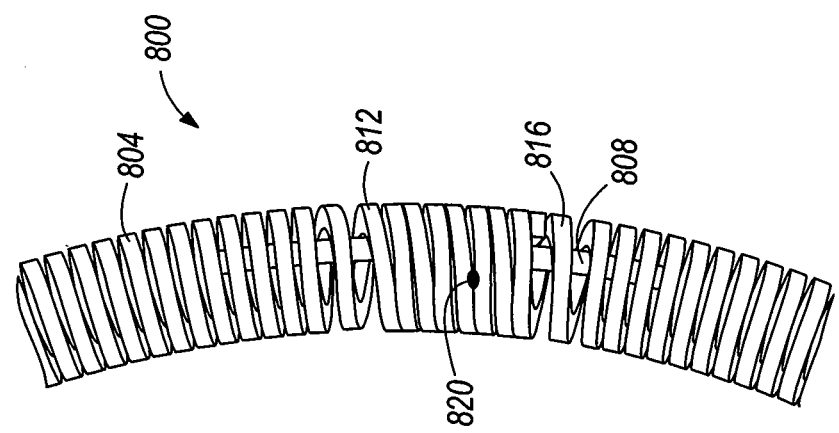
FIG. 8C illustrates the portion of the annulus spacer shown in FIG. 8A with a single spot weld or fusion weld.

FIGS. 8A and 8B illustrate another embodiment of an annulus spacer 800 in more detail. Similar to the annulus spacer 48 discussed above, the annulus spacer 800 includes a garter spring 804 and a girdle wire 808. In the illustrated embodiment, the garter spring 804 includes two end portions 812, 816 that are turned into each other and welded together so that the garter spring 804 forms a toroid. In some embodiments, the two end portions 812, 816 may be welded at a single location by, for example, a single spot weld 820 (FIG. 8C). In other embodiments, the two end portions 812, 816 may be welded at locations spaced approximately 180 degrees from each other around the coil circumference by, for example, two spot welds 824 (FIG. 8D). Such embodiments increase the strength and redundancy of the connection while maintaining the flexibility required to enable free rolling of the annulus spacer 800 between the pressure tube and the calandria tube. In still other embodiments, the end portions 812, 816 may be welded at a plurality of locations by, for example, a plurality of spot welds spaced around the circumference of the garter spring 804. In other embodiments, such as the embodiment shown in FIG. 8A, the end portions 812, 816 may be welded in a continuous strip partially or completely around the circumference of the garter spring 804. In any embodiment, the end portions 812, 816 may be welded together by, for example, laser welding or electron beam welding. In some embodiments, such as the illustrated embodiment, less than about four overlaps or interlocks of the end portions 812, 816 are interlocked and welded together to maintain flexibility of the annulus spacer 800.

In some embodiments, the cross-section of the garter spring 804 at the two end portions 812, 816 is optimized to have an approximately square or rectangular shape. This ideal cross-section is created by manufacturing the garter spring 804 from a straight or slightly curved wire that has an optimized trapezoidal cross-section. The wire is wound or bent via the manufacturing process into a coil, inducing compressive strain on the inner portion, or intrados, of the cross-section and tensile strain on the outer portion, or extrados, of the cross-section. The resultant cross-sectional shape is approximately square or rectangular and is optimized in order to maximize the strength of the garter spring 804 in bending, while minimizing the amount of material required to carry the necessary loads. By minimizing the amount of material required to carry a load, the parasitic effect of the garter spring 804 due to neutron absorption, attenuation, and reflection is lessened, which in turn directly leads to higher uranium utilization and efficiency of the reactor core. The garter spring cross-section has also been optimized in order to maximize the surface area in contact between the inter-wound end portions 812, 816 of the garter spring 804. This feature increases the strength and quality of the weld or plurality of welds. This feature also increases the ease and repeatability of creating the weld or plurality of welds that meet stringent nuclear industry standards, resulting in a lower cost per unit. Although not further discussed, this manufacturing technique may be applied to any garter spring disclosed herein.

Figure 9C:
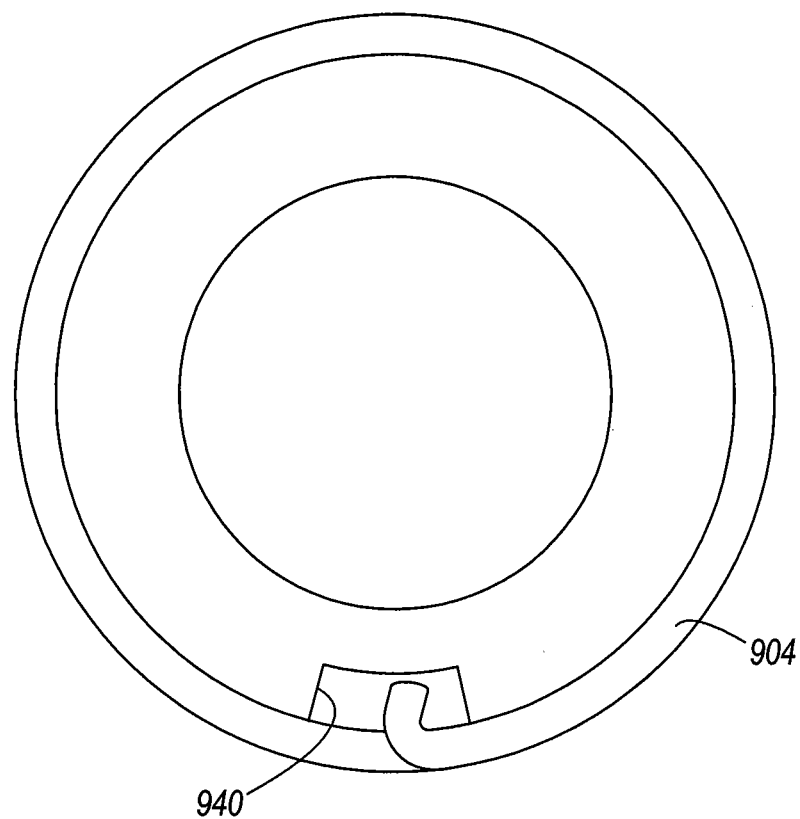
FIG. 9C is another cross-section of the annulus spacer shown in FIG. 9A.

FIGS. 9A and 9B illustrate a third embodiment of an annulus spacer 900. In the illustrated embodiment, the annulus spacer 900 includes a garter spring 904, a girdle wire 908, and a universal joint 912. The universal joint 912 includes a first hinge 916 and a second hinge 920, each having a groove 924, 928 to receive portions of the garter spring 904. A first end portion 932 of the garter spring 904 is positioned within the groove 924 of the first hinge 916 to connect the first end portion 932 to the universal joint 912. A second end portion 936 of the garter spring 904 is positioned within the groove 928 of the second hinge 920 to connect the second end portion 936 to the universal joint 912. In some embodiments, the end portions 932, 936 of the garter spring 904 may be, for example, press-fit or welded within the grooves 924, 928 to secure the end portions 932, 936 to the universal joint 912. In some embodiments (see, for example, FIG. 9C), a groove, notch, or hole 940 may be formed in each hinge 916, 920 so that each end of the garter spring 904 can be bent, punched, or generally deformed to sit in the groove, notch, or hole 940 to help inhibit the garter spring 904 from becoming unraveled from the universal joint 912.

The hinge portions 916, 920 of the universal joint 912 are coupled together by a cross-shaft 940. The cross-shaft 940 allows the universal joint 914 to pivot or bend in any direction, thereby maintaining the flexibility of the annulus spacer 900. As shown in FIG. 9B, the cross-shaft 940 defines a channel 944 through which the girdle wire 908 passes such that the girdle wire 908 does not interfere with movement of the universal joint 914.

Figure 10C:
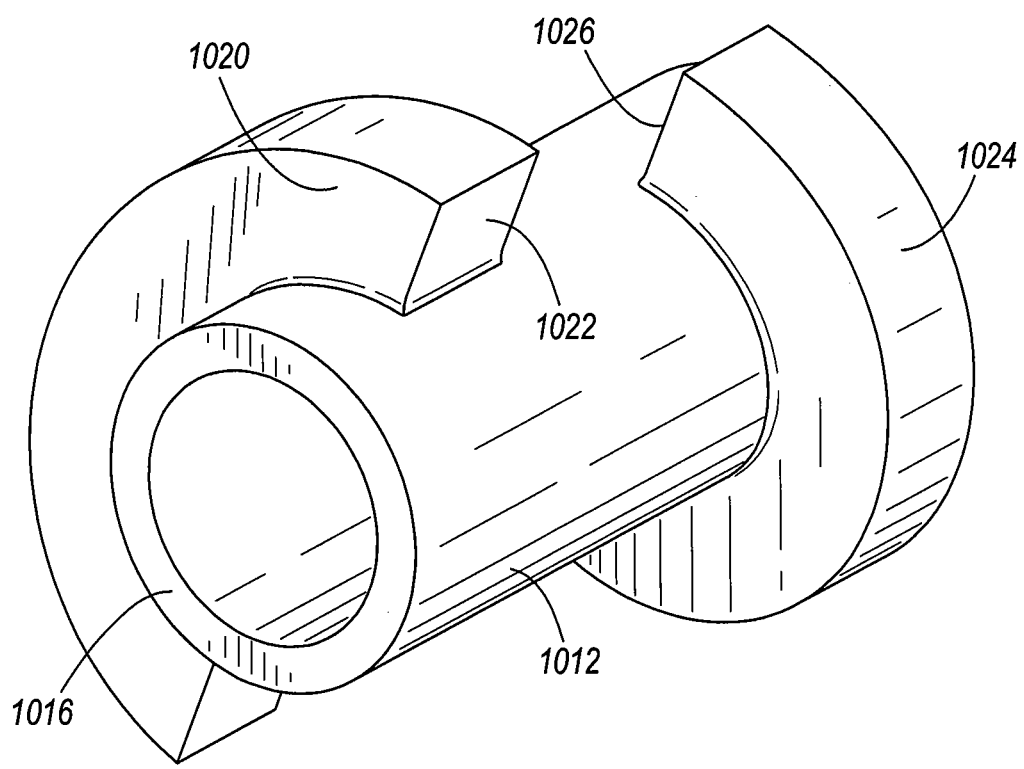
FIG. 10C is a perspective view of a sleeve joint for use with the annulus spacer shown in FIG. 10A.
Figure 10D:
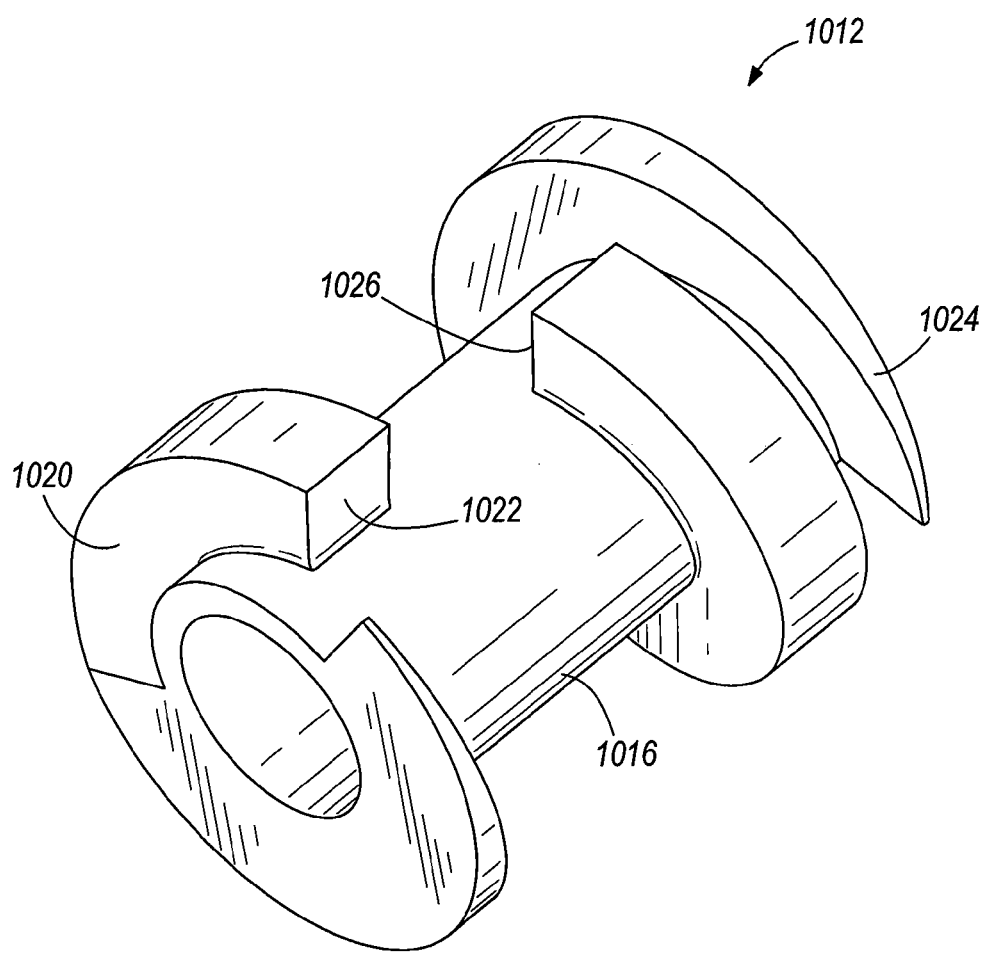
FIG. 10D is a perspective view of another sleeve joint for use with the annulus spacer shown in FIG. 10A.

FIGS. 10A and 10B illustrate a fourth embodiment of an annulus spacer 1000. In the illustrated embodiment, the annulus spacer 1000 includes a garter spring 1004, a girdle wire 1008, and a sleeve joint 1012. As shown in FIG. 10C, the sleeve joint 1012 includes a tubular member 1016 and a threaded shoulder 1020, 1024 positioned at each end of the tubular member 1016. In some embodiments, such as the embodiment shown in FIG. 10D, the threaded shoulders 1020, 1024 may be helical partially or totally around the circumference of the tubular member 1016.

Referring back to FIGS. 10A-10C, a first end portion 1028 of the garter spring 1004 surrounds a portion of the tubular member 1016 and is captured by the first shoulder 1020 and a second end portion 1032 of the garter spring 1004. The first end portion 1028 is stopped from rotation by a face 1026 formed on the second shoulder 1024. A second end portion 1032 of the garter spring 1004 surrounds another portion of the tubular member 1016 and is captured by the second shoulder 1024 and the first end portion 1028 of the garter spring 1004. The second end portion 1032 is stopped from rotation by a face 1022 formed on the first shoulder 1020. The threaded shoulders 1020, 1024, or flanges, inhibit the end portions 1028, 1032 of the garter spring 1004 from sliding axially off of the tubular member 1016. This arrangement of the first and second spring ends 1028 1032 with the tubular member 1016 requires that the first and second spring ends 1028, 1032 are axially overlapped with each other such that they are interlocked. In some embodiments, the end portions 1028, 1032 may also be secured to the tubular member 1016 by, for example, crimping, welding, press fitting, or fasteners.

The illustrated tubular member 1016 is short enough to not inhibit the spacer 1000 from rolling freely under operating conditions. The end portions 1028, 1032 have predetermined clock positions relative to each other when the spacer 1000 is unassembled (e.g., in straight form) such that a minimum torsion is required in the garter spring 1004 to keep the tubular member 1016 secure and prevent it from becoming loose relative to the end portions 1028, 1032. In some embodiments (see, for example, FIG. 9C), grooves, notches, or holes may be formed in the tubular member 1016 so that each end of the garter spring 1004 can be bent, punched, or generally deformed to sit in a corresponding groove, notch, or hole to help inhibit the garter spring 1004 from becoming unraveled from the sleeve joint 1012.

FIGS. 11A and 11B illustrate a fifth embodiment of an annulus spacer 1100. In the illustrated embodiment, the annulus spacer 1100 includes a garter spring 1104, a girdle wire 1108, and a ball joint 1112. The ball joint 1112 includes a female portion 1116 and a male portion 1120, each having a groove 1124, 1128 to receive portions of the garter spring 1104. A first end portion 1132 of the garter spring 1104 is positioned within the groove 1124 of the female portion 1116 to connect the first end portion 1132 to the ball joint 1112. A second end portion 1136 of the garter spring 1104 is positioned within the groove 1128 of the male portion 1120 to connect the second end portion 1136 to the ball joint 1112. In some embodiments, the end portions 1132, 1136 of the garter spring 1104 may be, for example, press-fit or welded within the grooves 1124, 1128 to secure the end portions 1132, 1136 to the ball joint 1112. In some embodiments (see, for example, FIG. 9C), a groove, notch, or hole may be formed in each joint portion 1116, 1120 so that each end of the garter spring 1104 can be bent, punched, or generally deformed to sit in the groove, notch, or hole to help inhibit the garter spring 1104 from becoming unraveled from the ball joint 1112.

The male portion 1120 of the ball joint 1112 includes a spherical boss 1140 that is inserted into the female portion 1116 to couple the portions 1116, 1120 together. The female portion 1116 defines slots 1144 that allows the female portion 1116 to slightly deflect to facilitate assembly of the ball joint 1112. When assembled, the spherical boss 1140 allows the ball joint 1112 to pivot or bend in any direction, thereby maintaining the flexibility of the annulus spacer 1100.

FIGS. 12A and 12B illustrate a sixth embodiment of an annulus spacer 1200. In the illustrated embodiment, the annulus spacer 1200 includes a garter spring 1204, a girdle wire 1208, and a bellows joint 1212. The bellows joint 1212 includes a generally flexible bellows 1216 having a first flange or shoulder 1220 and a second flange or shoulder 1224. A first end portion 1228 of the garter spring 1204 surrounds a portion of the bellows 1216 and is captured by the first flange 1220. A second end portion 1232 of the garter spring 1204 surrounds another portion of the bellows 1216 and is captured by the second flange 1224. The flanges 1220, 1224 inhibit the end portions 1228, 1232 of the garter spring 1204 from sliding axially off of the bellows 1216. In some embodiments, the end portions 1228, 1232 may also be secured to the bellows 1216 by, for example, adhesives, welding, or fasteners. The bellows 1216 bends in any direction to maintain the flexibility of the annulus spacer 1200. In some embodiments (see, for example, FIG. 9C), grooves, notches, or holes may be formed in the bellows 1216 so that each end of the garter spring 1204 can be bent, punched, or generally deformed to sit in the corresponding groove, notch, or hole to help inhibit the garter spring 1204 from becoming unraveled from the bellows joint 1212.

FIGS. 13A and 13B illustrate a seventh embodiment of an annulus spacer 1300. In the illustrated embodiment, the annulus spacer 1300 includes a garter spring 1304, a girdle wire 1308, and a flexible conduit joint 1312. The flexible conduit joint 1312 includes a first connector 1316 having a flange or shoulder 1320, a second connector 1324 having a flange or shoulder 1328, and a flexible conduit 1332 extending between the first and second connectors 1316, 1324. In some embodiments, the flexible conduit 1332 is formed from, for example, a flexible metal conduit or a braided wire hose. Portions of the flexible conduit 1332 are inserted into grooves 1336, 1340 in the connectors 1316, 1324 to couple the conduit 1332 to the connectors 1316, 1324. In some embodiments, the flexible conduit 1332 may be secured within the grooves 1336, 1340 by press-fitting, welding, adhesives, or the like.

A first end portion 1344 of the garter spring 1304 surrounds a portion of the first connector 1316 and is captured by the flange 1320. A second end portion 1348 of the garter spring 1304 surrounds a portion of the second connector 1324 and is captured by the flange 1328. The flanges 1320, 1328 inhibit the end portions 1344, 1348 of the garter spring 1304 from sliding axially off of the connectors 1316, 1324. In some embodiments, the end portions 1344, 1348 may also be secured to the connectors 1316, 1324 by, for example, adhesives, welding, or fasteners. In some embodiments (see, for example, FIG. 9C), a groove, notch, or hole may be formed in each connector 1316, 1324 so that each end of the garter spring 1304 can be bent, punched, or generally deformed to sit in the groove, notch, or hole to help inhibit the garter spring 1304 from becoming unraveled from the flexible conduit joint 1312. When assembled, the flexible conduit 1332 bends in any direction to maintain the flexibility of the annulus spacer 1300.

FIGS. 14A-14C illustrate an eighth embodiment of a connector 1400 for use with an annulus spacer. In the illustrated embodiment, the connector 1400 is a multiple component connector including a first connector 1404 and a second connector 1408. The first connector includes a flange 1412, or shoulder, and a male connector extension 1416 that mates with the second connector 1408. The second connector 1408 includes a flange 1420, or shoulder, and a locking female penetration 1424 that mates with the first connector 1404.

A first end portion of the garter spring is positioned within a groove 1432 in the first connector 1404 and is captured by the flange 1412. A second end portion of the garter spring is positioned within a groove 1436 in the second connector 1408 and is captured by the flange 1420. The flanges 1412, 1420 inhibit the end portions of the garter spring from sliding axially off of the connectors 1404, 1408. In some embodiments, the end portions may also be secured within the grooves 1432, 1436 by press-fitting, welding, adhesives, or the like. In some embodiments (see, for example, FIG. 9C), a groove, notch, or hole may be formed in each connector 1404, 1408 so that each end of the garter spring can be bent, punched, or generally deformed to sit in the groove, notch, or hole to help inhibit the garter spring from becoming unraveled from the multiple component connector 1400.

After each end of the garter spring is coupled to the corresponding connector 1404, 1408, the male connector extension 1416 is inserted into the locking female penetration 1424. The connectors 1404, 1408 are then rotated relative to each other approximately 90 degrees such that projections 1440 on the male connector extension 1416 slide into recesses 1444 in the locking female penetration 1424 to lock the connectors 1404, 1408 together.

FIGS. 15A-15C illustrate a ninth embodiment of an annulus spacer 1500. In the illustrated embodiment, the annulus spacer 1500 includes a garter spring 1504, a girdle wire 1508, and a connecting joint 1512. The connecting joint 1512 includes a male portion 1516 and a female portion 1520, each having a groove 1524, 1528 to receive portions of the garter spring 1504. A first end portion 1532 of the garter spring 1504 is positioned within the groove 1524 of the male portion 1516 to connect the first end portion 1532 to the connecting joint 1512. A second end portion 1536 of the garter spring 1504 is positioned within the groove 1524 of the female portion 1520 to connect the second end portion 1536 to the connecting join 1512. In some embodiments, the end portions 1532, 1536 of the garter spring 1504 may be, for example, press-fit or welded within the grooves 1524, 1528 to secure the end portions 1532, 1536 to the connecting joint 1512. In some embodiments (see, for example, FIG. 9C), a groove, notch, or hole may be formed in each joint portion 1516, 1520 so that each end of the garter spring 1504 can be bent, punched, or generally deformed to sit in the groove, notch, or hole to help inhibit the garter spring 1504 from becoming unraveled from the connecting joint 1512.

The male portion 1516 of the connecting joint 1512 includes a cylindrical boss 1540 that is inserted into the female portion 1520 to couple the portions 1516, 1520 together. The female portion 1520 defines slots 1544 that lock the male portion 1516 and the female portion 1520 together during assembly. When assembled, the cylindrical boss 1540 allows the male and female portions 1516, 1520 to rotate relative to each other, thereby maintaining the flexibility of the annulus spacer 1500.

Thus, the invention provides, among other things, an annulus spacer for the fuel channel of a nuclear reactor. Although the invention has been described in detail with reference to certain preferred embodiments, variations and modifications exist within the scope and spirit of one or more independent aspects of the invention. In addition, annulus spacers including any variations and/or combinations of garter springs and girdle wires disclosed herein are also within the scope of the invention.

Various features and advantages of the invention are set forth in the following claims.

The invention claimed is:

1. An annulus spacer for a fuel channel assembly of a nuclear reactor, the fuel channel assembly including a calandria tube and a pressure tube positioned at least partially within the calandria tube, the annulus spacer comprising:
   a garter spring configured to surround a portion of the pressure tube to maintain a gap between the calandria tube and the pressure tube, the garter spring including a first end and a second end;
   a sleeve joint including a tubular member extending between the first end and the second end of the garter spring such that the first end and the second end of the garter spring are coupled to the sleeve joint, the sleeve joint allowing movement of the annulus spacer when the pressure tube moves relative to the calandria tube during thermal cycles of the fuel channel assembly; and
   a girdle wire positioned substantially within the garter spring and configured to form a loop around the pressure tube, and wherein the girdle wire passes through the tubular member.

2. The annulus spacer of claim 1, wherein the tubular member has a first end coupled to the first end of the garter spring and a second end coupled to the second end of the garter spring such that the garter spring forms a toroid.

3. The annulus spacer of claim 1, wherein the sleeve joint includes a first flange positioned at a first end of the tubular member and a second flange positioned at a second end of the tubular member, wherein the first end of the garter spring surrounds a first portion of the tubular member and is retained by the first flange, and wherein a second end of the garter spring surrounds a second portion of the tubular member and is retained by the second flange.

4. The annulus spacer of claim 3, wherein the first and second flanges are first and second threaded shoulders, wherein the first end of the garter spring is threaded onto the first end of the tubular member and into engagement with the first threaded shoulder, and wherein the second end of the garter spring is threaded onto the second portion of the tubular member and into engagement with the second threaded shoulder.

5. The annulus spacer of claim 3, wherein the first end of the garter spring abuts a face defined by the second flange, and wherein the second end of the garter spring abuts a face defined by the first flange.

6. The annulus spacer of claim 3, wherein the first flange and second flange extend at least partially about a helical path around a circumference of the tubular member.

7. The annulus spacer of claim 3, wherein the sleeve joint is one integral piece that connects the first end and the second end of the garter spring.

8. The annulus spacer of claim 1, wherein the first and second ends of the garter spring axially overlap with each other on the tubular member.

9. The annulus spacer of claim 1, wherein the first and second ends of the garter spring have predetermined angular positions relative to each other when the spacer is unassembled.

10. The annulus spacer of claim 1, wherein the tubular member maintains the first end and the second end of the garter spring in a predetermined alignment to promote free rolling of the annulus spacer between the pressure tube and the calandria.

11. The annulus spacer of claim 1, wherein the first and second ends of the garter spring are secured to the sleeve joint by crimping, welding, press fitting or fasteners.

12. The annulus spacer of claim 1, wherein the first and second ends of the garter spring span an entire length of the tubular member.

13. An annulus spacer for a fuel channel assembly of a nuclear reactor, the fuel channel assembly including a calandria tube and a pressure tube positioned at least partially within the calandria tube, the annulus spacer comprising:
- a garter spring configured to surround a portion of the pressure tube to maintain a gap between the calandria tube and the pressure tube, the garter spring including a first end and a second end;
- a connector extending between the first end and the second end of the garter spring such that the first end and the second end of the garter spring are coupled to the connector to span an entire length of the connector such that the first and second ends of the garter spring interlock with each other on the connector, the connector allowing movement of the annulus spacer when the pressure tube moves relative to the calandria tube during thermal cycles of the fuel channel assembly; and
- a girdle wire positioned substantially within the garter spring and configured to form a loop around the pressure tube.

14. The annulus spacer of claim 13, wherein the connector includes a tubular member having a first portion and a second portion, and wherein the first end of the garter spring is coupled to the first portion of the tubular member and the second end of the garter spring is coupled to the second portion of the tubular member such that the garter spring forms a toroid.

15. The annulus spacer of claim 14, wherein the connector includes a first flange positioned on the first portion of the tubular member and a second flange positioned on the second portion of the tubular member, wherein the first end of the garter spring surrounds the first portion of the tubular member and is retained by the first flange, and wherein the second end of the garter spring surrounds the second portion of the tubular member and is retained by the second flange.

16. The annulus spacer of claim 15, wherein the first and second flanges are first and second threaded shoulders, wherein the first end of the garter spring is threaded onto the first portion of the tubular member and into engagement with the first threaded shoulder, and wherein the second end of the garter spring is threaded onto the second portion of the tubular member and into engagement with the second threaded shoulder.

17. The annulus spacer of claim 16, wherein the first threaded shoulder defines a face to inhibit the second end of the garter spring from further being threaded onto the tubular member, and wherein the second threaded shoulder defines a face to inhibit the first end of the garter spring from being further threaded onto the tubular member.

18. The annulus spacer of claim 15, wherein the first flange and second flange extend at least partially about a helical path around a circumference of the tubular member.

19. The annulus spacer of claim 13, wherein the connector is one integral piece that connects the first end and the second end of the garter spring.

20. The annulus spacer of claim 13, wherein the connector includes a tubular member through which the girdle wire passes.

21. The annulus spacer of claim 13, wherein the connector maintains the first and second ends of the garter spring in a predetermined alignment to promote free rolling of the annulus spacer between the pressure tube and the calandria.

22. The annulus spacer of claim 13, wherein the first and second ends of the garter spring are secured to the connector by crimping, welding, press fitting or fasteners.

23. A method of assembling an annulus spacer for a fuel channel assembly of a nuclear reactor, the method comprising:
- providing a garter spring forming a coil and having a first end and a second end;
- positioning a girdle wire within the coil formed by the garter spring;
- providing a sleeve joint including a tubular member having a first portion and a second portion;
- coupling the first end of the garter spring to the first portion of the tubular member, and coupling the second end of the garter spring to the second portion of the tubular member to form a toroid; and
- positioning the girdle wire to extend through the tubular member of the sleeve joint.

24. The method of claim 23, wherein the sleeve joint further includes a first flange positioned on the first portion of the tubular member and a second flange positioned on the second portion of the tubular member, wherein coupling the first end of the garter spring to the first portion of the tubular member includes threading the first end of the garter spring onto the first portion of the tubular member so that the first flange axially retains the first end of the garter spring, and wherein coupling the second end of the garter spring to the second portion of the tubular member includes threading the second end of the garter spring onto the second portion of the tubular member so that the second flange axially retains the second end of the garter spring.

25. The method of claim 24, further comprising abutting the first end of the garter spring with a face defined on an end of the second flange, and abutting the second end of the garter spring with a face defined on an end of the first flange.

26. The method of claim 23, further comprising spanning an entire length of the tubular member with the first and second ends of the garter spring when the first and second ends of the garter spring are coupled to the respective portions of the tubular member.

27. The method of claim 26, further comprising axially overlapping the first and second ends of the garter spring on the tubular member.

28. The method of claim 23, further comprising securing the first and second ends of the garter spring to the tubular member by crimping, welding, press fitting or fasteners.

* * * * *